US008578657B2

(12) United States Patent
Colucci et al.

(10) Patent No.: US 8,578,657 B2
(45) Date of Patent: Nov. 12, 2013

(54) DUAL PRESSURE INFLATABLE STRUCTURE AND METHOD (75) Inventors: D'nardo Colucci, Milwaukee, WI (US); David M. McConville, Asheville, NC (US); Clayton C. Hooker, Marshall, NC (US)

(73) Assignee: The Elumenati, LLC, Milwaukee, WI (US)

( * ) Notice: Subject to any disclaimer, the term of this patent is extended or adjusted under 35 U.S.C. 154(b) by 1025 days.

(21) Appl. No.: 11/997,297

(22) PCT Filed: Jul. 28, 2006

(86) PCT No.: PCT/US2006/029366
§ 371 (c)(1),
(2), (4) Date: Aug. 12, 2008

(87) PCT Pub. No.: WO2007/016328
PCT Pub. Date: Feb. 8, 2007

(65) Prior Publication Data
US 2008/0313969 A1    Dec. 25, 2008

Related U.S. Application Data (60) Provisional application No. 60/703,856, filed on Jul. 29, 2005.

(51) Int. Cl.
*E04G 11/04* (2006.01)
*E04H 15/20* (2006.01)

(52) U.S. Cl.
USPC ............... 52/2.16; 52/2.11; 52/2.23; 52/2.22; 52/2.24; 52/2.18

(58) Field of Classification Search
USPC ............. 52/2.16, 2.23, 2.11, 2.22, 2.24, 2.17; 135/126, 95, 87, 136
See application file for complete search history.

(56) References Cited

U.S. PATENT DOCUMENTS 3,720,455 A    3/1973  Sahlin
3,742,658 A    7/1973  Meyer
(Continued)

FOREIGN PATENT DOCUMENTS

EP    0947645 A2    10/1999
EP    1479129       11/2004
(Continued)

OTHER PUBLICATIONS

Carlin, P. S., "Lightweight Mirror Systems for Spacecraft—An Overview of Materials & Manufacturing Needs", *Proceedings of IEEE Aerospace Conference*, vol. 4, http://www.dtic.mil/matris/sbir/sbir021/af129.doc,(2000),169-182.

(Continued)

*Primary Examiner* — Chi Q Nguyen
(74) *Attorney, Agent, or Firm* — Schwegman Lundberg & Woessner, P.A.

(57) ABSTRACT

Embodiments include an inflatable support structure enclosing a region fillable by a fluid at a positive pressure above an atmospheric pressure. A flexible screen is attached to the support structure, a region between the flexible screen and the support structure fillable by a fluid at a negative pressure below the atmospheric pressure that holds the flexible screen in a shape suitable for image projection. A method according to embodiments includes inflating an inflatable support structure with a fluid at a positive pressure above an atmospheric pressure and removing fluid from a region between the support structure and a flexible screen attached to the support structure to hold the flexible screen in a shape suitable for image projection with the fluid at the negative pressure below the atmospheric pressure between the flexible screen and the support structure.

29 Claims, 4 Drawing Sheets

(56) References Cited

U.S. PATENT DOCUMENTS

| | | | |
|---|---|---|---|
| 3,998,522 A | | 12/1976 | Holzel |
| 4,022,522 A | | 5/1977 | Rain |
| 4,103,369 A | * | 8/1978 | Riordan .......... 52/2.14 |
| 4,288,947 A | | 9/1981 | Huang |
| 4,473,355 A | | 9/1984 | Pongratz |
| 4,672,389 A | | 6/1987 | Ulry |
| 4,807,405 A | | 2/1989 | Borgquist |
| 4,819,389 A | * | 4/1989 | Kihn .......... 52/2.21 |
| 4,976,074 A | * | 12/1990 | Delamare .......... 52/2.23 |
| 5,127,722 A | | 7/1992 | Nishitani |
| 5,487,400 A | * | 1/1996 | Dawkins .......... 135/87 |
| 5,566,512 A | * | 10/1996 | Page .......... 52/2.16 |
| 5,579,609 A | | 12/1996 | Sallee |
| 5,724,775 A | | 3/1998 | Zobel, Jr. et al. |
| 5,762,413 A | | 6/1998 | Colucci et al. |
| D396,115 S | | 7/1998 | Zobel, Jr. |
| 5,920,294 A | | 7/1999 | Allen |
| 6,022,172 A | | 2/2000 | Siyaj |
| 6,061,969 A | | 5/2000 | Leary |
| 6,104,405 A | | 8/2000 | Idaszak et al. |
| 6,119,408 A | * | 9/2000 | Page .......... 52/2.23 |
| 6,128,130 A | | 10/2000 | Zobel, Jr. et al. |
| D436,469 S | | 1/2001 | Idaszak et al. |
| D440,794 S | | 4/2001 | Zobel, Jr. et al. |
| 6,231,010 B1 | | 5/2001 | Schneider et al. |
| 6,231,189 B1 | | 5/2001 | Colucci et al. |
| 6,282,843 B1 | * | 9/2001 | Shibaike et al. .......... 52/2.11 |
| 6,409,351 B1 | | 6/2002 | Ligon |
| 6,453,619 B1 | * | 9/2002 | Delamare .......... 52/2.11 |
| 6,530,667 B1 | | 3/2003 | Idaszak |
| 6,547,189 B1 | | 4/2003 | Raboin et al. |
| 6,573,894 B1 | | 6/2003 | Idaszak et al. |
| 6,606,826 B2 | * | 8/2003 | Nagle .......... 52/2.18 |
| 6,650,304 B2 | | 11/2003 | Lee et al. |
| 6,733,136 B2 | | 5/2004 | Lantz et al. |
| D495,306 S | | 8/2004 | Fletcher et al. |
| 6,871,961 B2 | | 3/2005 | Balu et al. |
| 6,880,939 B2 | | 4/2005 | Colucci et al. |
| 6,897,832 B2 | | 5/2005 | Essig, Jr. et al. |
| 6,909,543 B2 | | 6/2005 | Lantz |
| 6,929,016 B2 | * | 8/2005 | Lee .......... 135/126 |
| 7,004,588 B2 | | 2/2006 | Sadler |
| 7,021,937 B2 | | 4/2006 | Simpson et al. |
| 7,770,590 B2 | * | 8/2010 | Serden et al. .......... 135/95 |
| 7,878,877 B2 | * | 2/2011 | Scherba .......... 446/220 |
| 2003/0213512 A1 | | 11/2003 | Lee |
| 2004/0046085 A1 | | 3/2004 | Veal et al. |
| 2005/0068618 A1 | | 3/2005 | Poretskin |
| 2005/0107175 A1 | | 5/2005 | Field et al. |
| 2006/0060706 A1 | | 3/2006 | Elam |
| 2006/0073748 A1 | | 4/2006 | Boujon |
| 2006/0112492 A1 | | 6/2006 | Wang |

FOREIGN PATENT DOCUMENTS

| | | |
|---|---|---|
| JP | 60-035856 U | 3/1985 |
| JP | 01-230874 A | 9/1989 |
| JP | 03-018839 | 1/1991 |
| JP | 09-311381 A | 12/1997 |
| JP | 10-088868 | 4/1998 |
| JP | 10-088868 A | 4/1998 |
| JP | 10-230743 A | 9/1998 |
| JP | 11-052485 A | 2/1999 |
| JP | 11-287056 A | 10/1999 |
| JP | 2002-062506 A | 2/2002 |
| JP | 04-250909 | 9/2004 |
| JP | 2004-250909 A | 9/2004 |
| JP | 05-017398 | 1/2005 |
| JP | 2005-017398 A | 1/2005 |
| WO | WO-03075397 A1 | 9/2003 |
| WO | WO-2006017223 A2 | 2/2006 |
| WO | WO-2007016328 A1 | 2/2007 |

OTHER PUBLICATIONS

Cassapakis, C., et al., "Inflatable Structures Technology Development Overview", *AIAA—1995-3738*, http://www.lgarde.com/people/papers/overview.pdf,(1995),1-10.

Chmielewski, A. B., et al., "ARISE Antenna", *IEEE Aerospace Conference Proceedings*, vol. 7, (2000),439-445.

Laikin, M., "Chapter 9—Very Wide Angle", In: *Lens Design*, Marcel Dekker, New York, NY (1991), p. 85.

Sankrithi, M., "Low-Cost Inflatable-Support Heliostats to Enable Cost-Effective Large-Scale Solar Thermal Power", *Final Technical Report, U.S. Department of Energy Inventions & Innovation*, Grant No. DE-FG36-01GO11023, A000, (Nov. 24, 2002),49 pgs.

Sterling, R D., et al., "Electronic Cinema using ILA Projector Technology", *SID Symposium Digest of Technical Papers*, vol. 30, Issue 1, (May 1999), p. 216-219.

"Chinese Application Serial No. 200680035228.8, Office Action mailed Aug. 21, 2009 (With English Translation)", 10 pgs.

"Chinese Application Serial No. 200680035228.8, Response filed Mar. 5, 2010 to Non Final Office Action mailed Aug. 21, 2009 (With English Translation)", 22 pgs.

"International Application Serial No. PCT/US2006/029366, Preliminary Report on Patentability mailed Nov. 24, 2009", 8 pgs.

"Avela Go-Dome™", [online]. [archived Nov. 2, 2006]. Retrieved from the Internet: <URL: http://web.archive.org/web/20061102101609/http:/www.e-planetarium.com/domes.htm, (2006), 2 pgs.

"International Application Serial No. PCT/US2006/029366, International Search Report mailed Dec. 21, 2006", 3 pgs.

"International Application Serial No. PCT/US2006/029366, Written Opinion mailed Dec. 21, 2006", 4 pgs.

"Japanese Application Serial No. 2008-524183, Office Action mailed May 31, 2011", (w/ English Translation), 10 pgs.

"Stargazer Planetariums—Negative Pressure Domes", [online]. [archived Feb. 6, 2005]. Retrieved from the Internet: <http://web.archive.org/web/20050206093114/http://www.stargazer-planetariums.co.uk/negativepressuredomes.htm>, (2010), 1 pg.

"The STARLAB Dome", [on-line], [archived May 16, 2005], Retrieved from the Internet: <URL: http://web.archive.org/web/20050516002928/http:/www.starlab.com/sldome.html>, (2005), 2 pgs.

"Japanese Application Serial No. 2008-524183, Office Action mailed May 15, 2012", (w/ English Translation), 8 pgs.

"Japanese Application Serial No. 2008-524183, Response filed Sep. 28, 2011 to Office Action mailed May 31, 2011", (w/ English Translation of Amended Claims), 21 pgs.

"Japanese Application Serial No. 2008-524183, Request for Appeal filed Sep. 12, 2012", (English Translation), 8 pgs.

"Japanese Application Serial No. 2008-524183, Response filed Sep. 12, 2012 to Office Action mailed May 15, 2012", (w/ English Translation of Claims), 21 pgs.

"Japanese Application Serial No. 2008-524183, Written Amendment filed Sep. 12, 2012", (English Translation), 7 pgs.

\* cited by examiner

DUAL PRESSURE INFLATABLE STRUCTURE AND METHOD

RELATED APPLICATIONS

This application is a U.S. National-Stage entry under 35 U.S.C. §371 based on International Application No. PCT/US2006/029366, filed Jul. 28, 2006 and published in English as WO 2007/016328 on Feb. 8, 2007, which designates the United States of America, and claims priority to U.S. Provisional Application Ser. No. 60/703,856, filed Jul. 29, 2005, which are incorporated herein by reference in their entirety.

TECHNICAL FIELD

This application relates generally to inflatable structures.

BACKGROUND

Inflatable structures have advantages such as greater portability and significantly smaller storage volumes over solid structures. Inflatable structures are used for temporary emergency shelters, fast deploying military structures, and masonry construction framing. In the field of dome theaters there are two families of air driven structures, purely inflatable structures and inflatable/solid structure hybrids.

In purely inflatable structures, structural integrity is provided through positive air pressure. For example, a single spherically tailored fabric shell is inflated using positive air pressure, like an inflated balloon. This structure is used in current portable dome theater implementations (i.e. Starlab from Learning Technologies, GoDome™ from e-Planetarium™). While providing a smooth concave screen surface, the main disadvantage of this design is the need for an airlock to prevent the positive air pressure from escaping while people enter or leave the shell.

There are many purely inflatable structures that do not require an airlock. For example, inflatable tent structures have inflatable support tubes with a fabric shell draped over the tubes. Another example has two concentric fabric shells that are joined through a series of ribs which hold the shells at a fixed separation when positive air pressure is applied. Other structures are shown in U.S. Pat. Nos. 3,742,658, 4,288,947, and 4,807,405. While all of these purely inflatable structures offer open doorway capability, none of them achieves a smooth concave screen surface.

In inflatable/solid structure hybrids, negative air pressure between a screen and an outer shell is used to draw a concave screen taut and smooth. The outer shell may be a solid structure such as in U.S. Pat. No. 3,998,522, or a fabric membrane stretched over a solid framing network such as in U.S. Pat. No. 4,022,522. This design form is not purely inflatable and is therefore less portable and less compact in storage.

There is a need for improved inflatable structures and methods.

DETAILED DESCRIPTION

In the following detailed description of various embodiments, reference is made to the accompanying drawings that form a part hereof, and in which are shown by way of illustration, and not of limitation, specific embodiments in which the subject matter may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that compositional, structural, and logical substitutions and changes may be made without departing from the scope of this disclosure. The following detailed description, therefore, is not to be taken in a limiting sense. Examples and embodiments merely typify possible variations. Individual components and functions are optional unless explicitly required, and the sequence of operations may vary. Portions and features of some embodiments may be included in or substituted for those of others. The following description is, therefore, not to be taken in a limiting sense.

The following detailed description of various embodiments pertains to inflatable structures of all scales used in applications ranging from large outdoor tents, to small personal enclosures which are suitable for projection of video on their surfaces. Inflatable structures have the advantages of simple and fast setup and teardown, compactness in shipping and no hard surfaces which may cause injury. Current inflatable structures rely on positive air pressure between two membranes to create rigidity and structural integrity. Using only positive air pressure makes it impossible to create a smooth concave surface. Current state of the art relies on many internal ribs to create such a surface, but there is always "pillowing" between each rib. This pillowing disturbs the continuity of an image projected on the inner surface. This is only one current state of the art.

The various embodiments described herein seek to solve the issue of pillowing on concave surfaces by adding an additional inner membrane or screen. Using a second blower, the air between the inner surface of the positive air pressure structure and the screen is evacuated, creating a region of negative air pressure. The negative air pressure pulls the screen taut into the desired concave shape. The advantage of such a structure is a smooth, continuous concave shape in an all inflatable structure.

The various embodiments described herein include an inflatable structure with both positive pressure and negative air pressure regions. In one embodiment, the above structure built with a pass through region that allows blower access to the inner negative pressure air space. In another embodiment, the above structure built with a pass through region which contains an in-line blower mounted within the pass through.

In the description herein the term "positive pressure" indicates a pressure of a fluid that is above an ambient pressure. For example, air in a region having a positive pressure has a pressure above the pressure of the ambient or atmospheric air. The term "negative pressure" indicates a pressure of a fluid that is below the ambient pressure. For example, air in a region having a negative pressure has a pressure below the pressure of the ambient or atmospheric air.

In the description herein the term "blower" refers to a pump moving a gaseous fluid such as air. A blower is capable of producing a negative pressure in a region by removing fluid from it, and is also capable of producing a positive pressure in a region by adding fluid to it.

Figure 1:
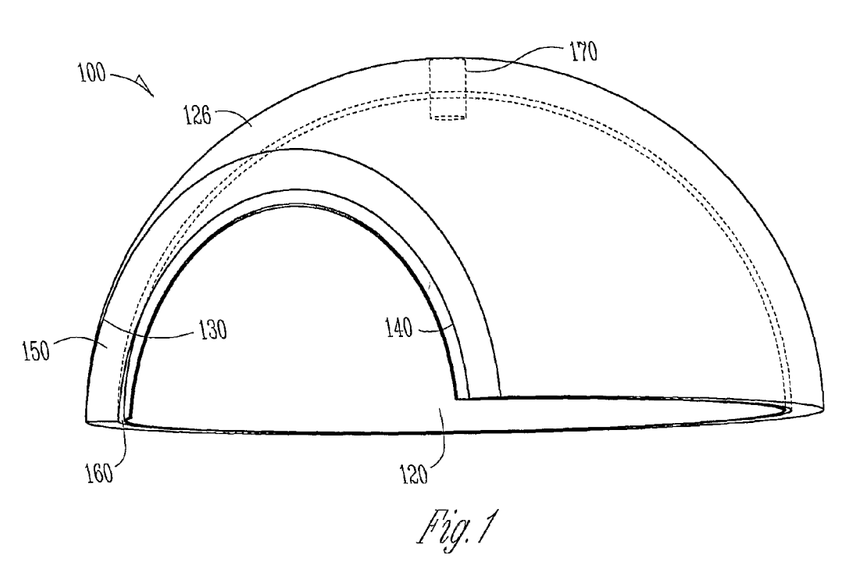
FIG. 1 illustrates an inflatable dome theater according to various embodiments.

FIG. 1 illustrates an inflatable dome theater 100 according to various embodiments. The inflatable dome theater 100 includes an interior surface 120 that is a screen or a membrane. The inflatable dome theater 100 also includes a freestanding, self-supporting support structure 126 having an outer wall 130 and an inner wall 140 enclosing a positive pressure region 150. The positive pressure region 150 is filled with air having a positive pressure to inflate the support structure to support the interior surface 120. A negative pressure region 160 exists between the inner wall 140 of the support structure 126 and the interior surface 120 and is filled with air having a negative pressure to draw the interior surface 120 taut such that the interior surface 120 has a desired shape. The interior surface 120, when taut and concave, can have a round or spherical shape, an oval shape, or any other shape desired. The interior surface 120, when taut, is concave with respect to the interior of the inflatable dome theater 100 and has a convex side adjacent the support structure 126. The inflatable dome theater 100 encompasses or completely surrounds the convex side of the interior surface 120.

A pass-through region 170 pierces the outer wall 130, the inner wall 140, and the interior surface 120 to provide multiple fluid paths to the regions or volumes between them. The pass-through region 170 includes an inline blower according to various embodiments to add fluid to the regions or remove fluid from the regions. In various embodiments, the pass-through region 170 can include two blowers or a single blower that moves fluid to result in both positive pressure and negative pressure regions.

The interior surface 120 has a perimeter that is located in at least two different geometrical planes, one of the planes being a floor of the inflatable dome theater 100 and another one of the planes being an opening or open doorway in the inflatable dome theater 100.

The shape of the interior surface 120 when taut may be different from the shape of the inner wall 140. Fluids other than air may be used to create the positive or negative pressure, or both the positive and negative pressure in the inflatable dome theater 100. For example, the positive pressure region 150 and the negative pressure region 160 may be filled with air or helium or any other fluid or combination of fluids capable of creating positive pressure or negative pressure in those regions.

The inflatable dome theater 100 can include a projection system (not shown) to project images or arrays of pixels onto the interior surface 120. The projection system includes a light engine and one or more lenses to project the images or arrays of pixels. The inflatable dome theater 100 includes a sound system with one or more speakers (not shown) for projecting voice and music into space within the inflatable dome theater 100. Spectators may sit on the floor or in seats (not shown) inside the inflatable dome theater 100 while perceiving images, voice, and/or music. In alternate embodiments, the projection system is mounted at a geometric center of the interior surface 120 to radially project images or arrays of pixels onto the interior surface 120. In an alternate embodiment, the projection system is located a distance from the geometric center of the interior surface 120.

The embodiment shown in FIG. 1 is inflatable where the support structure relies on positive pressure and the concave screen shape is achieved using negative pressure. This achieves the goal of a purely inflatable support structure with a smooth, concave screen and an open doorway without the various disadvantages of present day systems. For example, there is no need for an air lock.

Figure 2A:
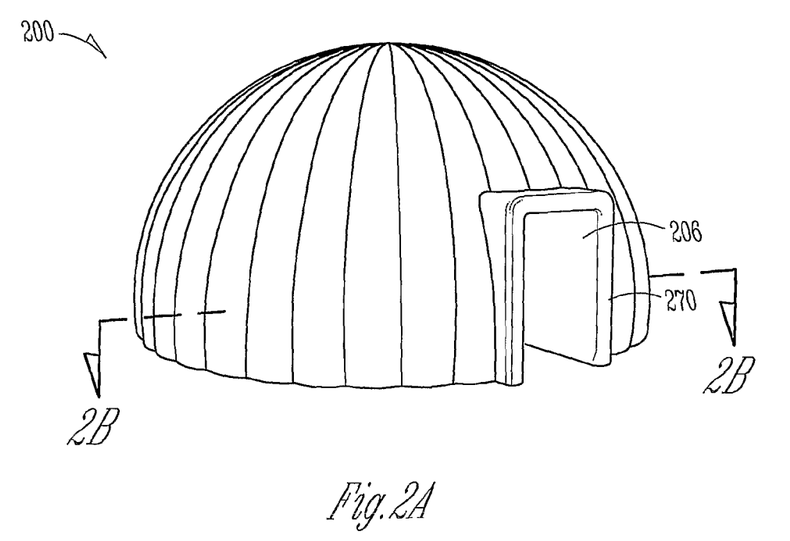
FIG. 2A illustrates an inflatable dome theater according to various embodiments.
Figure 2B:
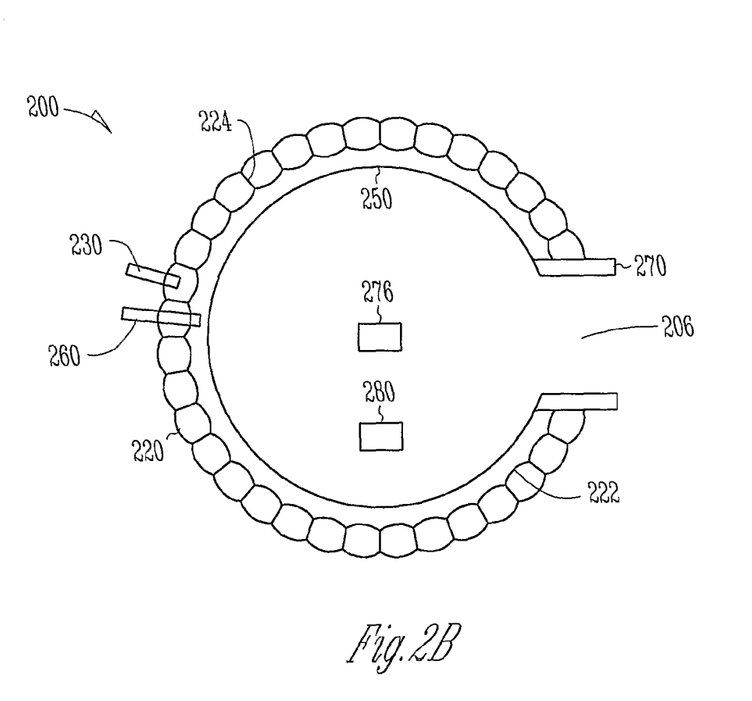
FIG. 2B illustrates a cross-sectional view of the inflatable dome theater shown in FIG. 2A according to various embodiments.

FIG. 2A illustrates an inflatable dome theater 200 according to various embodiments. The inflatable dome theater 200 includes an open doorway 206. FIG. 2B illustrates a cross-sectional view of the inflatable dome theater 200 along section line 3-3 according to various embodiments. The inflatable dome theater 200 includes a first membrane 220 and a second membrane 222 attached by a plurality of ribs 224 connected between the membranes 220 and 222. The membranes 220 and 222 are flexible, concentric, and spherical, the first membrane 220 being larger than the second membrane 222. Each of the ribs 224 is a single membrane, and may have openings such that air or another fluid may pass through the ribs 224. A positive pressure is applied between the membranes 220 and 222 through a first inlet 230 to force the membranes 220 and 222 apart until held in place by the ribs 224. The first inlet 230 pierces the first membrane 220 to provide a fluid path to a region or volume between the membranes 220 and 222. The membranes 220 and 222 and the ribs 224 form a freestanding, self-supporting support structure due to the positive pressure and a tension in the membranes 220 and 222 and the ribs 224.

A third membrane 250 is attached to the second membrane 222, and negative air pressure is applied between the third membrane 250 and the second membrane 222 through a second inlet 260 that pierces the membranes 220 and 222 to provide a fluid path to a region or volume between the membranes 222 and 250. A negative pressure is created in the region between the membranes 222 and 250 such that the third membrane 250 becomes taut to form a concave truncated spherical screen. Images or arrays of pixels may be projected onto the third membrane 250.

The third membrane 250 has a perimeter that is located in at least two different geometrical planes, one of the planes being a floor of the inflatable dome theater 200 and another one of the planes being the open doorway 206.

The third membrane 250, when taut, is concave with respect to the interior of the inflatable dome theater 200 and has a convex side adjacent the second membrane 222. The membranes 220 and 222 encompass or completely surround the convex side of the third membrane 250 and are attached to the third membrane 250 along its perimeter.

A blower (not shown) may be used to remove fluid from or add fluid to the regions or volumes between the membranes 220, 222, and 250. In various embodiments, two blowers may be used to move fluid to the regions or volumes, or a single blower may be used to move fluid to result in both positive pressure and negative pressure regions.

The membranes 220, 222, and 250 and the ribs 224 are made of a suitably flexible fabric such as nylon, vinyl, mylar, or other material that is capable of withstanding the forces resulting from the positive pressure or the negative pressure. The third membrane 250 is attached to the second membrane 222 with a suitable adhesive material, heat welding, or stitches such that a seal is formed between the third membrane 250 and the second membrane 222 to substantially reduce the occurrence of fluid leaks from the region between the third membrane 250 and the second membrane 222.

The third membrane 250, when taut, can have a round or spherical shape, an oval shape, or any other shape desired, and its shape may be different from the shape of the second membrane 222. Fluids other than air may be used to create the positive or negative pressure, or both the positive and negative pressure in the inflatable dome theater 200. For example, the region between the membranes 220 and 222 and the region between the membranes 222 and 250 may be filled with air or helium or any other fluid or combination of fluids capable of sustaining positive pressure or negative pressure in those regions.

The open doorway 206 is an open region passing through the membranes 220, 222, and 250 to allow spectators to move in and out of the inflatable dome theater 200. The open doorway 206 has an inflatable frame 270 of a suitably flexible fabric such as nylon, vinyl, mylar, or other material that is capable of withstanding the forces resulting from a positive pressure or a negative pressure. The frame 270 has an interior region or volume that may be filled with air or helium or any other fluid or combination of fluids capable of sustaining positive pressure in the interior region of the frame 270.

The embodiments shown in FIGS. 2A and 2B are inflatable where the support structure relies on positive pressure and the concave screen shape is achieved using negative pressure. This achieves the goal of a purely inflatable support structure with a smooth, concave screen and an open doorway without the various disadvantages of present day systems. For example, there is no need for an air lock. In addition, the embodiments shown in FIGS. 2A and 2B are conveniently implemented with a suitably flexible fabric such as nylon, vinyl, mylar, or other material.

The inflatable dome theater 200 can include a projection system 276 to project images or arrays of pixels onto the third membrane 250. The projection system 276 includes a light engine and one or more lenses to project the images or arrays of pixels. The inflatable dome theater 200 includes a sound system with one or more speakers 280 for projecting voice and music into space within the inflatable dome theater 200. Spectators may sit on the floor or in seats (not shown) inside the inflatable dome theater 200 while perceiving images, voice, and/or music. In alternate embodiments, the projection system 276 is mounted at a geometric center of the third membrane 250 to radially project images or arrays of pixels onto the third membrane 250. In an alternate embodiment, the projection system 276 is located a distance from the geometric center of the third membrane 250.

Figure 3:
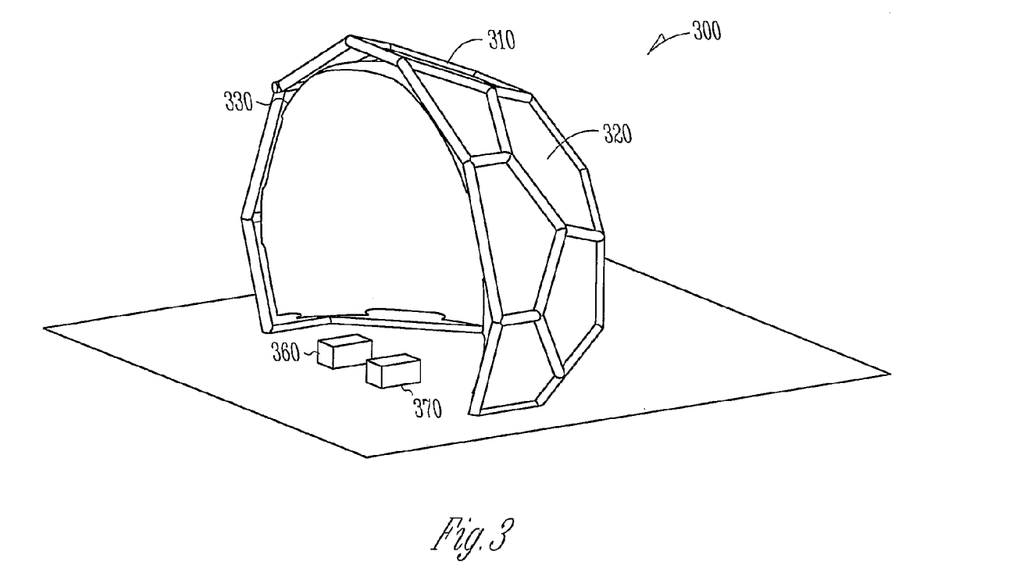
FIG. 3 illustrates an inflatable dome theater according to various embodiments.
Figure 4:
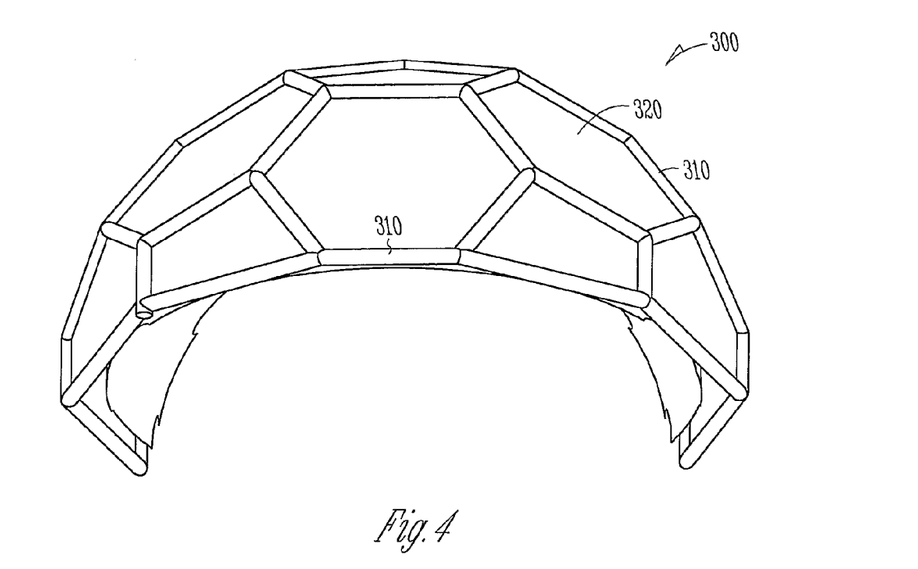
FIG. 4 illustrates a view of the inflatable dome theater shown in FIG. 3 according to various embodiments.

FIG. 3 illustrates an inflatable dome theater screen 300 according to various embodiments. The inflatable dome theater screen 300 has a support structure of tubes 310 and panels 320 connected together. The tubes 310 are connected to each other at distal ends to comprise a continuous pattern of plane figures or polygons bounded by the tubes, each plane figure enclosing a region as shown in FIG. 4 according to various embodiments. Such patterns include geodesics and Archimedean solids. A flexible panel 320 is attached contiguously to each tube 310 inside each region of each plane figure. The tubes 310 shown in FIG. 3 comprise a truncated icosahedron which is an Archimedean solid.

Figure 5:
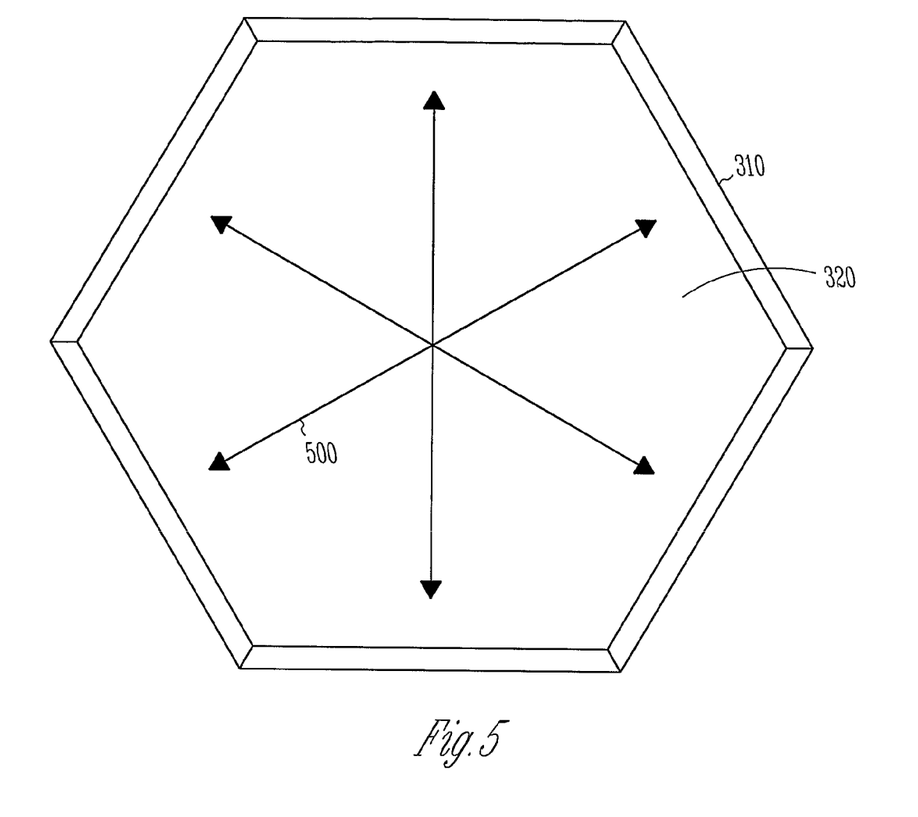
FIG. 5 is a schematic diagram of tension across a panel in the inflatable dome theater shown in FIG. 3 according to various embodiments.

The tubes 310 are inflated with fluid at a positive pressure to form a freestanding, self-supporting support structure. As the tubes 310 inflate, the flexible panels 320 are pulled taut because they are slightly undersized from nominal as dictated by the geometry of the inflated tubes 310. While the tubes 310 alone can form a freestanding, self-supporting support structure, the panels 320 are designed to provide additional structural support. FIG. 5 is a schematic diagram of tension 500 across one the panels 320 when the tubes 310 are inflated and the panel 320 is taut. The tension 500 approximates the tension of a single spherical shell inflated from the inside with positive air pressure.

The tubes 310 are connected to each other at distal ends having openings therein such that a fluid such as air can pass from one tube 310 to another such that the entire pattern of tubes 310 is inflated with fluid at a positive pressure through an opening or valve (not shown) in one of the tubes 310. The positive pressure can be supplied by a blower connected to the opening or valve in one of the tubes 310. In alternative embodiments, more than one of the tubes 310 can have an opening or valve connected to a blower to receive fluid at a positive pressure. In alternative embodiments, the tubes 310 are grouped into multiple regions, each region having a separate opening or valve (not shown). The tubes 310 in each region are connected together having openings to receive a fluid such as air from the opening or valve of the region such that tubes 310 in the region are inflated with fluid at a positive pressure. The positive pressure can be supplied by a blower connected to the opening or valve in each region.

A membrane 330 is attached (not shown) to the tubes 310 and panels 320, and negative air pressure is applied between the membrane 330 and the tubes 310 and panels 320. A negative pressure is created in the region between the membrane 330 and the tubes 310 and panels 320 such that the membrane 330 becomes taut to form a concave truncated screen. Fluid is removed from the region between the membrane 330 and the tubes 310 and panels 320 through an inlet (not shown). Images or arrays of pixels may be projected onto the membrane 330. The membrane 330, when taut and concave, can have a round or spherical shape, an oval shape, or any other shape desired.

The membrane 330 has a perimeter that is located in at least two different geometrical planes, one of the planes being a floor of the inflatable dome theater 300 and another one of the planes being an opening or open doorway of the inflatable dome theater 300.

The membrane 330, when taut, is concave with respect to the interior of the inflatable dome theater screen 300 and has a convex side adjacent the tubes 310 and panels 320. The tubes 310 and panels 320 encompass or completely surround the convex side of the membrane 330 and are attached to the membrane 330 along its perimeter.

The tubes 310, panels 320, and the membrane 330 are made of a suitably flexible fabric such as nylon, vinyl, mylar, or other material that is capable of withstanding the forces resulting from the positive pressure or the negative pressure. The membrane 330 is attached to the tubes 310 and panels 320 with a suitable adhesive material, heat welding, or stitches such that a seal is formed between the membrane 330 and the tubes 310 and panels 320 to substantially reduce the occurrence of fluid leaks from the region between the membrane 330 and the tubes 310 and panels 320.

The tubes 310 and the region between the tubes 310 and panels 320 and the membrane 330 may be filled with air or helium or any other fluid or combination of fluids capable of sustaining positive pressure or negative pressure in those regions.

A projection system 360 is located to project images or arrays of pixels onto the membrane 330 of the inflatable dome theater screen 300. The projection system 360 includes a light engine and one or more lenses to project the images or arrays of pixels. The inflatable dome theater screen 300 includes a sound system with one or more speakers 370 for projecting voice and music into space within the inflatable dome theater screen 300. Spectators may sit on the floor or in seats (not shown) inside the inflatable dome theater screen 300 while perceiving images, voice, and/or music. In alternate embodiments, the projection system 360 is mounted at a geometric center of the membrane 330 to radially project images or arrays of pixels onto the membrane 330. In an alternate embodiment, the projection system 360 is located a distance from the geometric center of the membrane 330.

Figure 6:
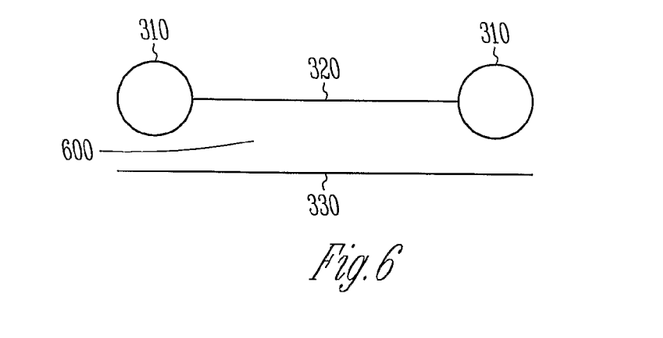
FIG. 6 illustrates a cross-sectional view of the inflatable dome theater shown in FIG. 3 according to various embodiments.

FIG. 6 illustrates a cross-sectional view of the inflatable dome theater screen 300 shown in FIG. 3 according to various embodiments. The panel 320 is attached to each tube 310 and is taut between the tubes 310 when the tubes 310 are inflated. The membrane 330 is separated from the tubes 310 and the panel 320 by a region 600 filled with a fluid.

The embodiments shown in FIGS. 3-6 are significantly different from the structural integrity offered by a standard tubular inflatable structure. The taut panels 320 help distribute perturbing forces across the entire support structure rather than just through a tube lattice. The embodiments shown in FIGS. 3-6 are inflatable where the support structure relies on positive pressure and the concave screen shape is achieved using negative pressure. This achieves the goal of a purely inflatable support structure with a smooth, concave screen and an open doorway without the various disadvantages of present day systems. For example, there is no need for an air lock. The embodiments shown in FIGS. 3-6 are conveniently implemented with a suitably flexible fabric such as nylon, vinyl, mylar, or other material. In addition, the embodiments shown in FIGS. 3-6 are constructed with less material than the embodiments shown in FIGS. 2A-2B through the use of tubes and flat panels.

Various embodiments described herein make use of a dual air pressure (positive and negative) to achieve a purely inflatable structure with a smooth, concave projection screen and an open doorway. The embodiments include a support structure and a screen that is, in various embodiments, a membrane. The support structure is a freestanding, self-supporting support structure that is inflated with a positive pressure. The screen or membrane has a desired concave shape and is attached to the support structure. Negative pressure between the support structure and the screen or membrane draws it taut creating the desired concave shape.

The embodiments described herein improve on existing inflatable structures designed for concave curved screen projection such as inflatable dome theaters. The embodiments described herein achieve the goal of a purely inflatable support structure with a smooth, concave screen and an open doorway without the various disadvantages of present day systems.

Embodiments include an inflatable support structure enclosing a region fillable by a fluid at a positive pressure above an atmospheric pressure. A flexible screen is attached to the support structure, the flexible screen having a perimeter that is located in two different geometrical planes, a region between the flexible screen and the support structure fillable by a fluid at a negative pressure below the atmospheric pressure that holds the flexible screen in a shape suitable for image projection. A method according to embodiments includes inflating an inflatable support structure with a fluid at a positive pressure above an atmospheric pressure and removing fluid from a region between the support structure and a flexible screen attached to the support structure to hold the flexible screen in a shape suitable for image projection with the fluid at the negative pressure below the atmospheric pressure between the flexible screen and the support structure, the flexible screen having a perimeter that is located in two different geometrical planes.

Embodiments include inflating an inflatable support structure with a fluid at a positive pressure above an atmospheric pressure and removing fluid from a region between the support structure and a flexible screen attached to the support structure to hold the flexible screen in a shape suitable for image projection with the fluid at the negative pressure below the atmospheric pressure between the flexible screen and the support structure, the support structure completely surrounding a convex side of the flexible screen. Inflating further includes inflating the inflatable support structure attached to a perimeter of the flexible screen, the perimeter of the flexible screen being located in two different geometrical planes. Inflating further includes inflating the inflatable support structure attached to the perimeter of the flexible screen located in one of the geometrical planes to support an open doorway through the support structure. Inflating further includes inflating an interior region of a frame around the open doorway with a fluid selected from the group consisting of one or more of air and helium, in any combination.

Embodiments further include inflating further includes inflating the inflatable support structure with a fluid selected from the group consisting of one or more of air and helium, in any combination and removing fluid further includes removing a fluid selected from the group consisting of one or more of air and helium, in any combination, from the region between the support structure and the flexible screen. Removing fluid further includes removing fluid from the region between the support structure and the flexible screen to hold the flexible screen in a smooth and concave shape with respect to the support structure. Removing fluid further includes removing fluid from the region between the support structure and the flexible screen to hold the flexible screen in a smooth and concave spherical shape or a smooth and concave oval shape with respect to the support structure. Removing fluid from a region further includes removing fluid from the region between the support structure and the flexible screen through a pass through region with a blower. Removing fluid from a region further includes removing fluid from the region between the support structure and the flexible screen through a pass through region with an in-line blower mounted within the pass through region.

Embodiments further include inflating a region between a first flexible membrane and a second flexible membrane smaller than the first flexible membrane with the fluid at the positive pressure, a plurality of flexible ribs being connected between the first flexible membrane and the second flexible membrane. Inflating further includes inflating the region between the first flexible membrane and the second flexible membrane that are concentric and spherical through a first inlet that pierces the first flexible membrane to provide a fluid path. Removing fluid from a region further includes removing fluid from the region between the second flexible membrane and the flexible screen through a second inlet that pierces the first flexible membrane and the second flexible membrane to provide a fluid path.

Embodiments further include inflating a plurality of inflatable tubes connected to each other at distal ends, the tubes forming a continuous pattern of polygons bounded by the tubes. Inflating an inflatable support structure further includes inflating the tubes connected to each other at distal ends to form an Archimedean solid. Inflating an inflatable support structure further includes inflating the tubes connected to each other at distal ends to form a truncated icosahedron. Inflating an inflatable support structure further includes inflating the tubes connected to each other at distal ends to form a geodesic solid. Inflating an inflatable support structure further includes inflating the tubes connected to each other at distal ends to pull taut a plurality of flexible panels, each flexible panel being attached contiguously to the tubes forming one of the polygons. Inflating an inflatable support structure further includes inflating the tubes connected to each other at distal ends to pull each flexible panel into tension, each flexible panel being undersized. Removing fluid from a region further includes removing fluid from the region between the tubes and the flexible screen, the flexible screen being attached to the tubes. Inflating an inflatable support structure further includes adding fluid to the tubes through an opening or valve in one of the tubes to receive the fluid, the tubes being connected to each other at distal ends with openings such that the fluid can pass from one tube to another to inflate the tubes. Inflating an inflatable support structure further includes adding fluid to the tubes through a plurality of openings or valves in the tubes to receive the fluid, the tubes being connected to each other at distal ends with openings such that the fluid can pass from one tube to another to inflate the tubes. Removing fluid from a region further includes removing fluid from the region between the tubes and the flexible screen through an inlet.

Embodiments further include projecting images or arrays of pixels onto the flexible screen from a projection system, the projection system including a light engine and one or more lenses to project the images or arrays of pixels. Embodiments further include projecting voice or music toward the flexible screen from a sound system with one or more speakers.

Embodiments further include inflating the region between the first flexible membrane and the second flexible membrane, the first flexible membrane being attached to the second flexible membrane and to the frame with adhesive material, heat welding, or stitches, the flexible ribs being attached to the first flexible membrane and the second flexible membrane with adhesive material, heat welding, or stitches, the flexible screen being attached to the second flexible membrane with adhesive material, heat welding, or stitches, and the frame, the flexible screen, the first flexible membrane, the second flexible membrane, and the flexible ribs being made of a flexible fabric selected from the group consisting of one or more of nylon, vinyl, mylar, in any combination.

Embodiments further include inflating the tubes to pull taut the flexible panels, each flexible panel being attached contiguously to the tubes with adhesive material, heat welding, or stitches, removing fluid from the region between the tubes and the flexible screen, the flexible screen being attached to the tubes and panels with adhesive material, heat welding, or stitches, and the flexible screen, the tubes, and the panels are made of a flexible fabric selected from the group consisting of one or more of nylon, vinyl, mylar, in any combination.

Embodiments further include means for supporting a flexible screen with a fluid at a positive pressure above an atmospheric pressure and means for holding the flexible screen in a shape suitable for image projection with the fluid at the negative pressure below the atmospheric pressure, the flexible screen having a perimeter that is located in two different geometrical planes. Embodiments further include means for allowing spectators to move into the means for supporting a flexible screen. The means for supporting a flexible screen completely surrounds a convex side of the flexible screen. Embodiments further include means for generating the positive pressure and means for generating the negative pressure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" may be used as the plain-English equivalents of the respective terms "comprising" and "wherein," respectively. Moreover, the terms "first," "second," and "third," etc. are used merely as labels, and are not intended to impose numerical requirements on their objects.

Other aspects and advantages may be found in the following numbered clauses.

What is claimed is:

1. An apparatus comprising:
an inflatable support structure enclosing a region fillable by a fluid at a positive pressure above an atmospheric pressure; and
a flexible screen attached to the support structure along an entire perimeter of the flexible screen, the inflatable support structure completely surrounding a convex side of the flexible screen, a region between the flexible screen and the support structure fillable by a fluid at a negative pressure below the atmospheric pressure that holds the flexible screen in a shape suitable for image projection.

2. The apparatus according to claim 1 wherein the perimeter of the flexible screen is located in two different geometrical planes.

3. The apparatus according to claim 2 wherein the perimeter of the flexible screen located in one of the geometrical planes defines an open doorway through the support structure, the open doorway including a frame having an interior region that is to be filled with a fluid selected from the group consisting of one or more of air and helium, in any combination.

4. The apparatus according to claim 1 wherein:
the region enclosed by the inflatable support structure is to be filled with a fluid selected from the group consisting of one or more of air and helium, in any combination; and
the region between the flexible screen and the support structure is to be filled with a fluid selected from the group consisting of one or more of air and helium, in any combination.

5. The apparatus according to claim 1 wherein the flexible screen is smooth and concave when the region between the flexible screen and the support structure is filled with a fluid at a negative pressure.

6. The apparatus according to claim 5 wherein the flexible screen has a spherical shape or an oval shape when the region between the flexible screen and the support structure is filled with a fluid at a negative pressure.

7. The apparatus according to claim 1, further comprising a pass through region to allow an in-line blower access to the region between the flexible screen and the support structure, the in-line blower being mounted within the pass through region.

8. The apparatus according to claim 1 wherein the inflatable support structure includes:
a first flexible membrane;
a second flexible membrane smaller than the first flexible membrane; and
a plurality of flexible ribs connected between the first flexible membrane and the second flexible membrane.

9. The apparatus according to claim 8, wherein:
a first inlet pierces the first flexible membrane to provide a fluid path;
a second inlet pierces the first flexible membrane and the second flexible membrane to provide a fluid path; and
the first flexible membrane and the second flexible membrane are concentric and spherical.

10. The apparatus according to claim 8 wherein:
the frame, the flexible screen, the first flexible membrane, the second flexible membrane, and the flexible ribs are made of a flexible fabric selected from the group consisting of one or more of nylon, vinyl, mylar, in any combination;
the first flexible membrane is attached to the second flexible membrane and to the frame with adhesive material, heat welding, or stitches;
the flexible ribs are attached to the first flexible membrane and the second flexible membrane with adhesive material, heat welding, or stitches; and
the flexible screen is attached to the second flexible membrane with adhesive material, heat welding, or stitches.

11. The apparatus according to claim 1 wherein the inflatable support structure includes a plurality of inflatable tubes connected to each other at distal ends, the tubes forming a continuous pattern of polygons bounded by the tubes, wherein the flexible screen is attached to the tubes.

12. The apparatus according to claim 11 wherein the continuous pattern of polygons bounded by the tubes is an Archimedean solid or a truncated icosahedron or a geodesic solid.

13. The apparatus according to claim 11, further comprising a plurality of flexible panels, each flexible panel being attached contiguously to the tubes forming one of the polygons.

14. The apparatus according to claim 13 wherein:
the flexible screen, the tubes, and the panels are made of a flexible fabric selected from the group consisting of one or more of nylon, vinyl, mylar, in any combination;
the tubes are attached to the panels with adhesive material, heat welding, or stitches; and
the flexible screen is attached to the tubes and panels with adhesive material, heat welding, or stitches.

15. The apparatus according to claim 11, further comprising:
a plurality of openings or valves the tubes to receive fluid, the tubes being connected to each other at distal ends with openings such that the fluid can pass from one tube to another to inflate the tubes; and
an inlet to the region between the tubes and the flexible screen to remove fluid.

16. A method comprising:
inflating an inflatable support structure with a fluid at a positive pressure above an atmospheric pressure; and
removing fluid from a region between the support structure and a flexible screen attached to the support structure to hold the flexible screen in a shape suitable for image projection with the fluid at the negative pressure below the atmospheric pressure between the flexible screen and the support structure, the support structure completely surrounding a convex side of the flexible screen and the flexible screen being attached to the support structure along an entire perimeter of the flexible screen.

17. The method according to claim 16 wherein inflating further includes inflating the inflatable support structure attached to the perimeter of the flexible screen, the perimeter of the flexible screen being located in two different geometrical planes.

18. The method according to claim 16 wherein:
inflating further includes inflating the inflatable support structure with a fluid selected from the group consisting of one or more of air and helium, in any combination; and
removing fluid further includes removing a fluid selected from the group consisting of one or more of air and helium, in any combination, from the region between the support structure and the flexible screen.

19. The method according to claim 16 wherein removing fluid further includes removing fluid from the region between the support structure and the flexible screen to hold the flexible screen in a smooth and concave shape with respect to the support structure.

20. The method according to claim 16 wherein removing fluid from a region further includes removing fluid from the region between the support structure and the flexible screen through a pass through region with an in-line blower mounted within the pass through region.

21. The method according to claim 16 wherein inflating further includes inflating a region between a first flexible membrane and a second flexible membrane smaller than the first flexible membrane with the fluid at the positive pressure, a plurality of flexible ribs being connected between the first flexible membrane and the second flexible membrane.

22. The method according to claim 16 wherein inflating an inflatable support structure further includes inflating a plurality of inflatable tubes connected to each other at distal ends, the tubes forming a continuous pattern of polygons bounded by the tubes.

23. The method according to claim 22 wherein inflating an inflatable support structure further includes inflating the tubes connected to each other at distal ends to pull taut a plurality of flexible panels, each flexible panel being attached contiguously to the tubes forming one of the polygons.

24. The method according to claim 22 wherein removing fluid from a region further includes removing fluid from the region between the tubes and the flexible screen, the flexible screen being attached to the tubes.

25. The method according to claim 16, further comprising projecting images or arrays of pixels onto the flexible screen from a projection system, the projection system including a light engine and one or more lenses to project the images or arrays of pixels.

26. The method according to claim 16, further comprising projecting voice or music toward the flexible screen from a sound system with one or more speakers.

27. An apparatus comprising:
an inflatable support structure enclosing a region fillable by a fluid at a first pressure; and
a flexible screen attached to the support structure along an entire perimeter of the flexible screen, the support structure completely surrounding a convex side of the flexible screen, a region between the flexible screen and the support structure fillable by a fluid at a second pressure that holds the flexible screen in a shape suitable for image projection.

28. The apparatus according to claim 27 wherein the perimeter of the flexible screen is located in two different geometrical planes.

29. The apparatus according to claim 28 wherein:
the perimeter of the flexible screen located in one of the geometrical planes defines an open doorway through the support structure;
the first pressure is a positive pressure above an atmospheric pressure; and
the second pressure is a negative pressure below the atmospheric pressure.

* * * * *